United States Patent Office 3,104,933
Patented Sept. 24, 1963

3,104,933
METHOD OF DYEING WITH POLYVINYL ALCOHOL ESTER AND QUATERNARY AMMONIUM COMPOUNDS
Meyer Mendelsohn, New York, and Carl Horowitz, Brooklyn, N.Y., assignors to Yardney International Corp., New York, N.Y., a corporation of New York
No Drawing. Filed July 11, 1960, Ser. No. 41,745
22 Claims. (Cl. 8—85)

This invention relates to the treatment of polyamides, proteinaceous materials such as wool, hair, silk, etc., cellulosic materials, such as cotton, rayon, cellulose acetate, paper, wool and other types of cellulosics as well as latex rubber (*Hevea brasiliensis*), and to a process for improving their dyeability. More particularly, the invention relates to the treatment of such materials with compositions to bring about increased receptivity of these types of matter to a wide range of various types of dyes.

Currently, polyamides are generally dyed with basic dyes and a few acid type dyestuffs although the proteinaceous cellulosics and latex rubber materials are readily dyed with a broad range of dyestuffs. Even through the dyes presently employed give good color and wash-fastness, there still exists a need for compositions and a method which impart to these materials a greater uptake of dyes while at the same time retaining good dye-fastness under varying conditions such as washing, sunlight and the like. Furthermore, there exists a need for compounds and a method for treating polyamides, proteinaceous, cellulosics and latex rubber materials therewith that permit dyeing of these compositions with a wide range of dyestuffs such as direct, direct developed, basic, disperse, reactive, vat and acid dyes and the like simply and in less time than presently necessary.

Accordingly, it is a primary object of this invention to provide new compositions of matter capable of imparting improved dyeability to polyamides, proteinaceous, cellulosic materials and latex rubber by a large variety of dyestuffs.

It is another object of this invention to provide a method for dyeing polyamides, proteinaceous, cellulosic materials and latex rubber.

It is still another object of the invention to provide polyamides, proteinaceous, cellulosic materials and latex rubber dyed with a large variety of dyestuffs.

Other objects and advantages of the invention will be readily apparent from the following description.

Generally, the objects of the invention are attained by treating the polyamides, proteinaceous, cellulosic materials and latex rubber with a composition selected from the group consisting of (1) a mono ester of polyvinyl alcohol and a polycarboxylic acid and (2) a combined product comprising (*a*) a mono ester of polyvinyl alcohol and a polycarboxylic acid and (*b*) a quaternary ammonium halide prepared by the reaction of an epihalohydrin, an epihalide or an alkyl halide with a tertiary fatty acid amine and subsequently, dyeing the treated material with dyestuffs, such as acid, direct, direct developed, basic, disperse, vat or reactive dyes and the like.

Preparation of the treatment agent can be carried out in a relatively simple manner. The polyvinyl alcohol mono-ester is prepared by reacting a polycarboxylic acid with the alcohol and discontinuing the reaction at a stage prior to the onset of substantial cross-linking, i.e. while there are still available a large number of unreacted carboxyl groups in the ester formed. The degree of esterification is dependent upon a number of factors such as the number of moles of polyvinyl alcohol, the temperature employed in the process and the duration of the reaction. The degree of esterification may, of course, be determined by conventional tests. Although the number of moles of any particular acid employed is not critical, it is preferred that, for every mole of acid utilized, the polyvinyl alcohol be employed in a range of 0.1 to 10 moles.

Polycarboxylic acids suitable for use in the present invention include aromatic as well as saturated and unsaturated aliphatic acids. Examples of these types of acids include aconitic, adipic, alginic, aspartic, azelaic, citric, decanedicarboxylic, diglycolic, glucuronic, glutamic, glutaric, itaconic, maleic, malic, malonic, naphthalic, oxalic, phthalic, pimelic, polyacrylic, sebacic, suberic, succinic and tartaric acids and the like. The corresponding anhydrides can also be employed.

The mono-ester is prepared by mixing the reactants in hot water (about 90°–100° C.) and heating until the desired degree of esterification has taken place.

The quaternary ammonium halide is prepared by reacting a tertiary fatty-acid amine with an epihalohydrin, an epichloride or an alkyl halide in the presence of an inorganic acid, preferably hydrochloric acid and in an alcoholic solvent. Here again, although the amounts of reactants are not critical, it is preferred that stoichiometric amounts be employed in the preparation of the quaternary amine.

Epihalohydrin and epihalides contemplated for use in the present invention are those having the general formula

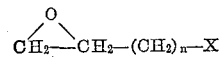

wherein X is a halogen selected from the group consisting of chlorine, bromine and iodine and $n$ is an integer from 1 to 18 inclusive. Representative epihalohydrins and epihalides coming within the above formula include epibromohydrin, epichlorohydrin nad epiiodohydrin; epihalides, such as epiethyl chloride, epibutyl chloride, epipropyl chloride, epioctylchloride, epioctadecylchloride, epihexadecylchloride; and the bromo and iodo forms of these and similar compounds.

The alkyl halides which are utilized in preparing the quaternary ammonium halides employed in this invention are aliphatic halides containing from 1 to 18 carbon atoms in the alkyl group. Such compounds include methyl chloride, ethyl chloride, propyl chloride, butyl chloride, octyl chloride, octadecyl chloride, hexadecyl chloride, and the bromo and iodo forms of these and similar compounds.

The tertiary fatty-acid amines reacted with the halides defined hereinabove are those having the general formula

wherein R is an alkyl group containing from 8 to 18 carbon atoms and R′, R″ are alkyl groups containing from 1 to 18 carbon atoms. Among the large number of compounds included in this formula there are octyldimethyl amine, nonyldiethyl amine, decyldipropyl amine, hexadecyldimethyl amine, octadecyldimethyl amine, soyamine, cocoamine and the like.

It is readily apparent, therefore, that a large variety of compounds can be utilized to prepare the quaternary ammonium halides useful in the practice of this invention. Regardless of what compounds coming within the above-defined formulae which are employed, the quaternary ammonium halides resulting from the reaction have one or the other of the following formulae:

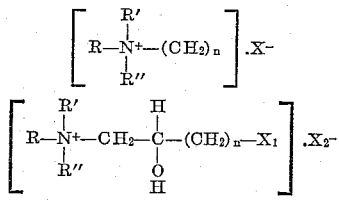

wherein R, R' and R'' are as defined hereinabove, $n$ is defined as hereinabove, X and $X_1$ are selected from the group consisting of chlorine, bromine and iodine and $X_2$ is the anionic group of an inorganic acid. The compounds thus obtained may be referred to as quaternary ammonium halides having at least one substituted group containing 8 or more carbon atoms in the carbon chain. It is to be noted that in carrying out the reaction, as mentioned hereinabove, any inorganic acid may be employed although hydrochloric acid is preferred. Accordingly, when a quaternary ammonium halide is formed from a tertiary-fatty-acid amine and an aliphalide, $X_2$ in the formula above results from the reaction of the acid employed which although it is a catalyst, also gives up its anionic group thereby forming a quaternary ammonium halide which contains the anionic group of the particular acid utilized in the reaction.

Representative quaternary ammonium halide coming within the generic formulae given above are octadecyldimethylethyl ammonium chloride, hexadecyldimethylbutyl ammonium chloride, heptadecyldimethylethyl ammonium chloride, octyldiethylpropyl ammonium chloride, decyldimethylpropyl ammonium chloride, nonylmethylethylbutyl ammonium chloride, octadecyldimethyl 2-hydroxy, 3-chloropropyl ammonium chloride, hexadecyldimethyl 2-hydroxy, 3-chlorobutyl ammonium chloride and the iodo and bromo forms of these and similar compounds.

In the production of the quaternary ammonium chloride, the alcoholic solvent may be initially heated to about 65° C. whereupon the fatty-acid amine is added thereto along with the inorganic acid. Subsequently the halide is added to the mixture in incremental amounts and then the entire reaction mixture is refluxed at about 86° C. to form the quaternary ammonium halide. The refluxing period may last for about four hours. Naturally the time will vary considerably, depending upon the amount of reactants present. The alcohols preferably used as solvents include methyl, ethyl, propyl, and isopropyl alcohols, but any alcohol generally used as a solvent can be employed.

The two products so prepared are then utilized in the treatment of polyamides, proteinaceous materials, cellulosic materials and latex rubber to enhance their dye receptivity by contacting the polyamides in an aqueous solution of the products. This contact may be by immersion, spraying on any other suitable method and the materials being treated can be used alone or in mixture or blends.

Where desirable, the mono-ester of the polyvinyl alcohol polycarboxylic acid can be employed alone. It is preferred, however, that the monoester and the quaternary ammonium halide described hereinabove be employed as a mixed product in aqueous solution. Regardless of which combination is used, that is, the mono-ester alone or the mixed product, the aqueous solution can contain from 0.1 to 20% by weight of the composition, based on the total weight of the solution. However, it is preferred that the solution contain from 1.0% to 15%. In those instances where a combined product is employed, it is preferred that the quaternary ammonium halide constituent be present in at least an equal amount by weight with respect to the ester, based on the total weight of both components employed in the final formulation. Using equal amounts of both constituents results in better dyeing even through such limits are not critical.

Dyeing of the treated materials can be carried out in a relatively simple manner when employing the new compositions of this invention in the process. Generally, a treated material to be dyed is simply immersed in the solution of the products described above and then subsequently in a heated dye bath in the usual manner. Good dyeing is also achieved, however, in cold dye baths, as an example, immersion of polyamides in the solution of the new composition for as little as 5 seconds and subsequently in the dye bath for as little as 10 minutes results in an exceptional dye uptake, and attainment of complete or almost complete exhaustion of the dye in the dye bath. This unusual speed of exhaustion of the dye bath by polyamides treated with the new composition of this invention stands out in sharp contrast to the normal immersion period in the dye bath of from: 40 minutes to 5 hours generally necessary to dye polyamides (nylon) by normal procedures presently employed on a commercial scale. Generally the dye bath is held at a temperature in a range of 50° C. to 100° C. The length of time in which the material is held in the bath will vary depending upon the amount and type of material present and the concentration of dyes in the bath. In carrying out the practice of the instant invention a time limitation as low as 10 minutes and as high as about 30 minutes have been found to give good color quality with the dyes set forth hereinabove. It will be readily apparent, to those skilled in the art, that in order to get penetration of the reagents of this invention on the materials to be treated, regardless of its shape or form, that it will be necessary to immerse the material in a hot solution (80° C. to 100° C.) of the treating reagents of this invention prior to application of the dyes.

When dyeing polyamides, proteinaceous and/or cellulosic materials or latex rubber in accordance with the practice of this invention, the dye or dyes are employed in a bath in an amount of 1 gram to 6 grams of dye for 100 grams of material to be dyed with excellent color quality being attained. These are the lower limits and one can employ the dye in greater concentrations, being limited, as a practical matter, by that point where a given amount of dye in the dye bath is not exhausted by a given amount of material.

Representative dyes which can be employed in the practice of the parent invention and their new color index numbers as set forth in the 1959 Technical Manual of the American Association of Textile Chemists and Colorists, vol. XXXV, published by Hanes Publishing Company Inc., New York, N.Y., follow below. There are acid dyes, direct dyes, developed dyes, basic dyes, disperse dyes, and reactive dyes.

Among the acid dyes there are Acid Yellow II, New Color Index 18860, Fast Light Yellow R, Acid Yellow 17, New Color Index 18965, Fast Light Yellow GGXN conc. CF, Xylene Light Yellow 3-G, Acid Yellow 99, New Color Index 13900, Palatine Fast Yellow GRNA-C.F., Acid Orange 7, New Color Index 15510, Acid Orange Y, Acid Orange 45, New Color Index 22195, Supranol Orange RA-conc., Acid Red 18, New Color Index 16255, Scarlet 4R Supra, Acid Red 182, New Color Index 18736, Talco Fast Neutral Red 6-B, Acid Blue 25, New Color Index 62055, Anthraquinone Blue SWF, Acid Blue 90, New Color Index 42655, Brilliant Blue J, Acid Blue 158, New Color Index 14880, Super Fast Blue CGNS Ex. 200%, Acid Black 1, New Color Index 20470, Acid Black BRX, Acid Black 52, New Color Index 15711, Vitrolan Black WA and the like. Direct dyes include Direct Yellow 8, New Color Index 13920, Direct Fast Bright Yellow CG, Direct Yellow 50, New Color Index 29025, Diphenyl Fast Yellow RLSW, Direct Orange 15, New Color Index 40002, Direct Fast Orange 6RAS, Direct Orange 34, New Color Index 40215, Calodur Orange EGL, Direct Orange 72, New Color Index 40205, Direct Fast Orange 2R, Direct Red 1, New Color Index 22310, Diphenyl Fast Red B conc., Borden 4 RB, Direct Red 39, New Color Index 23630, Direct Fast Scarlet 3–B, Direct Red 81, New Color Index 28160, Diphenyl Fast Red 5BL, Supra 1, Direct Violet 60, Calcodur Violet 4RL, Direct Blue 1, New Color Index 24410, Niagra Sky Blue 6B, Direct Blue 15, New Color Index 24400, Niagra Sky Blue, Direct Blue 78, New Color Index 34200, Calcodur Blue 4 GL, Direct Fast Blue 4 GLN, Direct Black 8C, New Color Index 31600, Diazine Black OB, Durofast Black OTB, Calcamine Diaxo Black OBD. Basic dyes include Sevrin BSR Black, Sevrin G Blue, Sevrin R Yellow and the like. Among the reactive dyes are Brilliant Blue R, Procion Yellow RS, Procion Brilliant Orange GS, Cibarron Brilliant Yellow G. Disperse dyes include Blue GA Ex. CF, New Color Index 64500, Fast Blue FBBN Ex., New Color Index 61505, Fast Pink BA–CF, New Color Index 11005, Scarlet BA Ex. New Color Index 11110, Brilliant Blue B, New Color Index 61505 and the like. Direct developed dyes include Diazo Black BH, New Color Index 22590, Diazo Black OB, New Color Index 31600, Diazo Blue BR, New Color Index 34085, Diazo Bordeaux 2BL, New Color Index 28215, Diazo Red 5BL, New Color Index 28360 and the like. The dyes set forth are illustrative of the types of dyes that can be employed on polyamides treated with the reagents disclosed herein. The particular dyes listed are not limitative and many more coming within the described classification are available for use.

The polyamides which can be employed in the practice of the instant invention are linear polyamides containing recurring units of the formula:

wherein x and y are integers from 2 to 18 inclusive. Such polyamides can be prepared in accordance with the procedures known in the art, i.e., by the polymerization of diamines and dibasic acids or by the polycondensation of amino acids or by the polymerization of lactams. The polymerization of diamines and dibasic acids include the reaction of acids such as malonic acid, glutaric acid, methyl glutaric acid, adipic acid, suberic acid, azelaic acid and the like with tetramethylene diamine, pentamethylene diamine, and hexamethylene diamine and the like. Suitable amino acids which can be polymerized to polyamides include 6-amino caproic acid, 8-amino caprylic acid, 17-amino heptadecanoic acid and the like, including the lactams of such acids.

The physical form of the polyamide at the time it is treated with the above identified reagents before being contacted with a dye is not critical. For example, it may be in the form of a finished fabric woven or non woven, polyamide films, staple, flock, continuous filament, spun yarn, mixed yarns such as the combination of polyamide staple and wool polyamide staple and cotton, polyamide staple and rayon, and the like.

Furthermore, the polyamides may also be in the form of flakes or ground into a fine powder before they are treated with either the reagent and/or the dyes. The present invention also contemplates the treatment of the polyamide with the reagents of this invention when it is placed in a melt spinning apparatus from which it is extruded through spinnerets in the shape of fibers or filaments. When such is the case, the fibers or filaments so formed, after they have been oriented along the fiber axes and drawn to the desired length can be placed directly in contact with the dyes.

Proteinaceous matter which can also be employed in the practice of this invention includes wool, silk, hair, such as animal and human hair and other proteinaceous matter. As mentioned hereinbefore with respect to the polyamides, the proteinaceous matters can be used in accordance with the practice of this invention in varying forms. Accordingly, the proteinaceous matter can be in the form of fibers and filaments, rods, flakes, grains or powders and the like.

Cellulosic materials can also be treated with the reagents of this invention and subsequently dyed with greatly improved results. Such cellulosic materials include rayon, cotton, cellulosic acetate, paper, wood, and other types of cellulosic materials. As stated here and above with respect with polyamides the cellulosic material can be utilized in widely varying forms such as filaments, fibers, rods, bristles, etc.

Latex rubber (*Hevea brasiliensis*) can also be treated with reagents of this invention and can be dyed with greatly improved results. As mentioned with reference to the foregoing materials, the latex rubber treated with reagents of this invention prior to dyeing can assume varying physical shapes and forms before treatment. That is to say, the result may be in the form of a shaped article of rigid construction, or a shaped article which is collapsible, or if desirable, the rubber latex may be treated and dyed before being shaped.

The following examples are illustrative and not limitative. In these examples all parts and percentages are by weight unless otherwise stated.

*Example I*

(A) A polyvinyl alcohol/succinic acid partial ester is formed by dissolving 11 grams of polyvinyl alcohol with 25 grams of succinic anhydride in 100 cc. of water and heated for about 30 minutes at 90° C. A completely clear solution of ester is obtained.

(B) A quaternary ammonium chloride is prepared by heating 65 cc. of ethyl alcohol of 65° C. in a three-neck flask equipped with a stirrer, a thermometer and a reflux condenser. 4.0 grams of octadecyl dimethylamine and 6.6 grams of concentrated hydrochloric acid are added to the alcohol. Subsequently 51.1 grams of epichlorohydrin is added to the reaction mixture through a dropping funnel in incremental amounts over a 45 minute period. The entire reaction mixture is then refluxed at a temperature of 86° C. for 4 hours to form a quaternary amine and the alcohol is subsequently removed by distillation.

The products were then combined by taking 40 grams of the quaternary (B) ammonium chloride and 100 cc. of the polyvinyl succinate (A) ester solution and mixing them with 300 cc. of hot water (80° C.) and heating the mixture to about 90° C. until the solution is complete.

This combined product was employed in carrying out dyeing in the examples which follow below.

*Example II*

The combined product of Example 1 containing 19% solids is diluted with hot water to 2% solids and a temperature is maintained at 80° C. A 5 gram sample of a woven fabric of polyhexamethylene adipamide is immersed in the solution for one minute, removed, washed with water and placed in 250 cc. of hot water on a waterbath. To this there is added 25 cc. of 0.2% solution of a direct dye, Geigy Yellow RLSW. After 15 to 20 minutes the dye solution was exhausted and the fabric had a deep yellow color comparable to a yellow color used on a cotton control sample. A like sample of untreated polyhexamethylene adipamide when immersed in the dye required 45 minutes to partially exhaust the dye solution. Furthermore, the untreated fabric was a non-uniform pale yellow after dyeing.

*Example III*

The steps followed in Example 2 were repeated except that after the polyhexamethylene adipamide fabric had been immersed in the treating agent it was then cured at 380° F. for 20 seconds with a hot iron and subsequently washed before dyeing. The results after dyeing were the same as those achieved in Example 2. These results clearly show that where a fabric treated with the agent of this invention is placed through a heat treatment and then washed before dyeing that excellent results still are obtained.

*Example IV*

The steps of Examples 2 and 3 were repeated except that the fabric was boiled off before treatment with the combined polyvinyl succinate ester/quaternary ammonium chloride reagent. The boiling off step is the standard factory procedure. After boiling off, the fabric was then treated with the reagent and dyed as in the prior examples. The treated fabric showed a deep uniform yellow tone whereas a control fabric was pale yellow and non-uniform in color.

*Example V*

The procedure carried out in the foregoing examples was again repeated with a dye bath containing diphenyl G Fast Blue GLN, manufactured by Geigy. A deep dark blue color was obtained on the fabric which was treated by the reagent before dyeing. On the other hand, the non treated control sample was a very light non-uniform blue.

*Example VI*

Repetition of the procedure set forth in the foregoing examples was again carried out except that the dye bath contained Procion Brilliant Blue R, manufactured by Arnold, Hoffman Co. There again the treated fabric dyed a deep blue while the untreated fabric was a light non-uniform blue.

*Example VII*

Samples of treated and untreated fabric were again processed as in the foregoing examples with the exception that the treatment solution contained 1.5% polyvinyl alcohol carboxylic acid ester/quaternary ammonium chloride product and this was heated to its boiling point before immersing the fabric therein, for 5 seconds and subsequently washing the treated fabric with the water before dyeing. Results comparable to those achieved in the foregoing examples were obtained.

*Example VIII*

The process employed in Example 7 was carried out on a 5 gram sample of nylon 6 (polyepsiloncaprolactam) which showed excellent color quality and uniformity with all of the dyes mentioned in the foregoing examples.

*Example IX*

A polyvinyl alcohol/succinic acid partial ester prepared according to the method described in Example 1 was used on a polyhexamethylene adipamide fabric in accordance with the procedure in the foregoing examples. Excellent color quality and uniformity was attained with all of the dyes employed. A control sample did not dye well.

*Example X*

A 5 gram sample of grey human hair was treated in accordance with the procedure of Example 2. Excellent color quality and uniformity was attained with all of the dyes employed. A control sample did not dye well and was much lighter in color.

*Example XI*

The combined product of Example 1 containing 19% solids is diluted with hot water to 2% solids and a temperature is maintained at 80° C. A 5 gram sample of a sheet of cotton immersed in the solution for one minute, removed, washed with water and placed in 250 cc. of hot water on a waterbath. To this there is added 25 cc. of 0.2% solution of a direct dye, Geigy Yellow RLSW. After 15 to 20 minutes the dye solution was exhausted and the fabric had a deep yellow color comparable to a yellow color used on a cotton control sample. A like sample of an untreated sheet of cotton immersed in the dye was nonuniform in color.

*Example XII*

The combined product of Example 1 containing 19% solids is diluted with hot water to 2% solids and a temperature is maintained at 80° C. A 5 gram sample of a sheet of rubber latex immersed in the solution for one minute, removed, washed with water and placed in 250 cc. of hot water of a waterbath. To this there is added 25 cc. of 0.2% solution of a direct dye, Geigy Yellow RLSW. After 15 to 20 minutes the dye solution was exhausted and the fabric had a deep yellow color comparable to a yellow color used on a cotton control sample. A like sample of an untreated sheet of rubber latex immersed in the dye was nonuniform and lighter in color.

The new process and the treatment agents of this invention present many advantages. For example, the reagents for treating the materials as disclosed herein are easily prepared from chemicals which are readily available on the open market at reasonable cost. Furthermore, materials treated with the agents have increased dye receptivity resulting in excellent dye uptake and brilliant colors which are fast to washing, sunlight and the like. In addition to these advantages, treated materials can be dyed in a minimum amount of time by presently existing methods and with existing machinery. Because of the rapid uptake of dyes and improved color of materials treated in accordance with the teachings of this invention, the new process disclosed and claimed herein lends itself to a continuous operation. Numerous other advantages will be readily apparent to those skilled in the art.

Numerous modifications and embodiments of this invention can be made without departing from the spirit and scope thereof and it is to be understood that the invention is not to be limited as deferred in the appended claims.

We claim:

1. A method for dyeing a polymer selected from the group consisting of polyamides, proteinaceous materials, cellulosic materials and latex rubber comprising contacting said polymer to be dyed with a product selected from the group consisting of (1) a partial polyvinyl alcohol ester of a polycarboxylic acid and (2) a partial polyvinyl alcohol ester of a polycarboxylic acid and an aliphatic quaternary ammonium halide having at least one substituent group containing from 8 to 18 carbon atoms in the carbon chain and subsequently contacting the treated material with a dye until the desired color is attained.

2. A process according to claim 1 wherein said partial polyvinyl alcohol ester is prepared by the reaction of 1 mole of acid and from 0.1 to 10 moles of polyvinyl alcohol.

3. A method according to claim 1 wherein said aliphatic ammonium halide is of formula

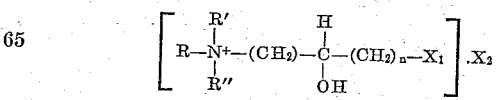

wherein R, R' and R" are aliphatic radicals at least one of which has from 8 to 18 carbon atoms in the carbon chain, $n$ is an integer from 1 to 18 inclusive, and $X_1$ and $X_2$ are halides selected from the group consisting of chlorine, bromine and iodine.

4. A method for dyeing a polymer selected from the group consisting of polyamides, proteinaceous materials, cellulosic materials and latex rubber comprising contacting said polymer to be dyed with an aqueous solution containing from 0.1% to 20%, by weight, based on the total weight of said solution, of a product selected from a group consisting of (1) a partial polyvinyl alcohol ester of a polycarboxylic acid and (2) a partial polyvinyl alcohol ester of a polycarboxylic acid and an aliphatic quaternary ammonium halide having at least one substitutent group containing from 8 to 18 carbon atoms in the carbon chain and subsequently contacting the treated material with a dye until the desired color is attained.

5. A method for dyeing a polymer selected from the group consisting of polyamides, proteinaceous materials, cellulosic materials and latex rubber comprising contacting said polymer to be dyed with an aqueous solution at a temperature in a range of 80° C. to 100° C. and containing from 0.1% to 20% by weight, based on the total weight of said solution, of a product selected from a group consisting of (1) a partial polyvinyl alcohol ester of a polycarboxylic acid and (2) a partial polyvinyl alcohol ester of a polycarboxylic acid and an aliphatic quaternary ammonium halide having at least one substituent group containing at from 8 to 18 carbon atoms in the carbon chain and subsequently contacting the treated material with a dye until the desired color is attained.

6. The method as defined in claim 5 wherein the product is the partial polyvinyl alcohol ester of phthalic acid.

7. The method as defined in claim 5 wherein the product is the partial polyvinyl alcohol ester of succinic acid.

8. The method as defined in claim 5 wherein the product is the partial polyvinyl alcohol ester of sebacic acid.

9. The method as defined in claim 5 wherein the product is the partial polyvinyl alcohol ester of adipic acid.

10. The method as defined in claim 5 wherein the product is the partial polyvinyl alcohol ester of itaconic aicd.

11. The method as defined in claim 5 wherein the product contains the partial polyvinyl alcohol ester of succinic acid and octadecyldimethyl-2-hydroxy-3-chloropropyl ammonium chloride.

12. The method as defined in claim 5 wherein the product contains the partial polyvinyl alcohol ester of adipic acid and hexadecyldimethyl-2-hydroxy-3-chloropropyl ammonium chloride.

13. The method as defined in claim 5 wherein the product is the partial polyvinyl alcohol ester of itaconic acid and octadecyldimethylethyl ammonium chloride.

14. The method as defined in claim 5 wherein the product contains the partial polyvinyl alcohol ester of sebacic acid and heptadecyldimethylethyl ammonium iodide.

15. A method for dyeing a polymer selected from the group consisting of polyamides, proteinaceous materials, cellulosic materials and latex rubber comprising immersing said polymer to be dyed for at least 5 seconds in an aqueous solution having a temperature in the range of 80° C. to 100° C. and containing from 0.1% to 20% by weight, based on the total weight of the solution of a product selected from a group consisting of (1) a partial polyvinyl alcohol ester of a polycarboxylic acid and (2) a partial polyvinyl alcohol ester of a polycarboxylic acid and an aliphatic quaternary ammonium halide having at least one substituent group containing at from 8 to 18 carbon atoms in the carbon chain and subsequently contacting and treated material with a dye solution for a period of from 10 minutes to 30 minutes.

16. The method as defined in claim 15 wherein the dye solution contains from 1 to 6 grams of dye for each 100 grams of material being treated.

17. The method as defined in claim 16 wherein the dye bath is held at a temperature in a range of 50° C. to 100° C.

18. A manufactured article comprising a polyamide treated with a product selected from the group consisting of (1) a partial polyvinyl alcohol ester of a polycarboxylic acid and (2) a partial polyvinyl alcohol ester of a polycarboxylic acid and an aliphatic quaternary ammonium halide having at least one substituent group containing at least 8 carbon atoms in the carbon chain and subsequently contacted with a dye.

19. A manufactured article as described in claim 18 wherein the polyamide is polyhexamethylene adipamide.

20. An article of manufacture according to claim 18 wherein said article is a shaped article of manufacture.

21. An article of manufacture according to claim 18 wherein said aliphatic ammonium halide is of formula

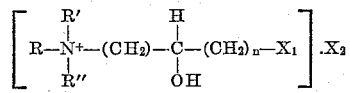

wherein R, R' and R" are aliphatic radicals at least one of which has from 8 to 18 carbon atoms in the carbon chain, $n$ is an integer from 1 to 18 inclusive, and $X_1$ and $X_2$ are halides selected from the group consisting of chlorine, bromine and iodine.

22. A manufactured article comprising proteinaceous material treated with a product selected from the group consisting of (1) a partial polyvinyl alcohol ester of a polycarboxylic acid and (2) a partial polyvinyl alcohol ester of a polycarboxylic acid and an aliphatic quaternary ammonium halide having at least one substituent group containing from 8 to 18 carbon atoms in the carbon chain and subsequently contacted with a dye.

References Cited in the file of this patent

UNITED STATES PATENTS

| 2,292,211 | Dickey | Aug. 4, 1942 |
| 2,387,931 | Muskat | Oct. 30, 1945 |
| 2,881,045 | Mecco et al. | Apr. 7, 1959 |
| 2,965,594 | Maeder | Dec. 20, 1960 |

FOREIGN PATENTS

| 758,937 | Great Britain | Nov. 10, 1953 |

OTHER REFERENCES

J.S.D.C., August 1940, p. 345.